J. M. STEBBINS.
Dental-Plugger.
No. 203,667. Patented May 14, 1878.
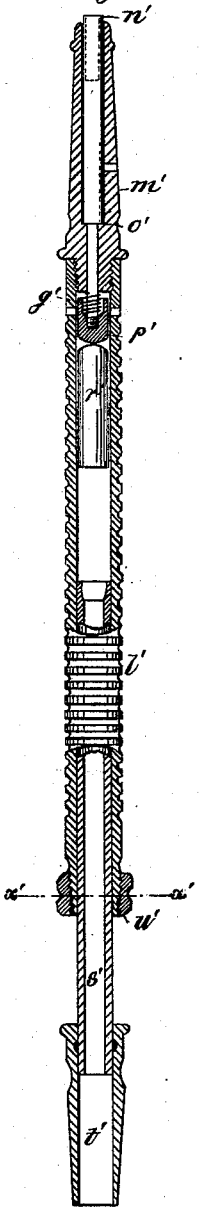
WITNESSES:
W. W. Hollingsworth
Edw. W. Byrn.
INVENTOR:
J. M. Stebbins
BY
ATTORNEYS.

UNITED STATES PATENT OFFICE.

JULIUS M. STEBBINS, OF NEW YORK, N. Y.

IMPROVEMENT IN DENTAL PLUGGERS.

Specification forming part of Letters Patent No. 203,667, dated May 14, 1878; application filed March 6, 1878.

*To all whom it may concern:*

Be it known that I, JULIUS M. STEBBINS, of the city, county, and State of New York, have invented a new and Improved Dental Plugger; and I do hereby declare that the following is a full, clear, and exact description of the same, reference being had to the accompanying drawing, forming part of this specification, in which—

Figure 1 is a longitudinal section, showing a portion of the outer surface of the handle; Fig. 2, a transverse section through the line $x$ $x$ of Fig. 1.

My invention relates to certain improvements in pneumatic dental pluggers of that class in which a loosely-sliding and closely-fitting block or mallet is made to reciprocate in a nicely-bored tubular chamber from the alternate compression and suction of the air in the rear of the same, so as to cause the said mallet to deliver a series of blows upon the anvil of the tool-holder.

The improvements consist in the means for regulating the stroke of the mallet, as hereinafter more fully described.

Referring to the accompanying drawings, the pneumatic plugger consists of a tubular handle, $l'$, which is milled externally and grooved circumferentially at short intervals throughout its entire length. To one end of the handle is fitted a tapering piece, $m'$, which contains a movable tool-holder, $n'$, which is shouldered at $o'$, and provided at its inner end with a chambered convex head or anvil, $p'$, between which and the inner end of the piece $m'$ a spiral spring, $g'$, is placed. The tool-holder is bored at its outer end to receive the shanks of interchangeable plugger-tools, and it is kept from turning by a slot formed in its side, and a screw that projects into the said slot from the piece $m'$. A mallet, $r'$, consisting of a cylindrical piece of steel, is fitted to the tubular handle, so that it may slide easily therein. Into the end of the tubular handle, opposite the piece $m'$, a sliding tube, $s'$, is fitted, the inner end of which is counterbored, to permit the free escape of air, and to its outer end is swiveled a tapering tube, $t'$, for receiving the rubber tube, by which the plugger is connected with any suitable air-forcing device. The end of the tubular handle $l'$, that receives the sliding tube $s'$, is conically threaded on the outside, and is split and provided with a milled nut, $u'$, by which the end of the tubular handle is contracted, so as to bind the sliding tube $s'$ in any desired position. The end of the mallet $r'$, which strikes against the cap or anvil $p'$, is convex, and the tubular handle is apertured upon this side, to permit the entrance and escape of air.

The range of the reciprocation of the mallet, and hence the force of the blow, is regulated by pushing the tube $s'$ into or withdrawing it from the tubular handle $l'$, and fixing it in position by means of the nut $u'$.

With respect to the employment of the nut and the conically-threaded and split handle for adjusting the tube $s'$, I would state that I am aware that tools have been held in their handles by a nut upon a conical thread formed on the end of a split tube, and I therefore only claim the combination of these devices with the tube $s'$, for adjusting the stroke of the mallet.

Having thus described my invention, what I claim as new is—

1. The inner adjustable tube $s'$, connected with the flexible air-tube, and combined with the tubular handle and the mallet, for the purpose of defining the length of the stroke, substantially as described.

2. The nut $u'$, in combination with the split and conically-threaded end of the tubular handle $l'$, and the adjustable tube $s'$, substantially as described.

JULIUS M. STEBBINS.

Witnesses:
 GEO. M. HOPKINS,
 C. SEDGWICK.